(12) United States Patent
Lang et al.

(10) Patent No.: US 10,693,129 B2
(45) Date of Patent: Jun. 23, 2020

(54) SYNTHESIS OF SILICON-CARBON COMPOSITE IN A GAS PHASE REACTOR

(71) Applicant: EVONIK OPERATIONS GMBH, Essen (DE)

(72) Inventors: Juergen Erwin Lang, Karlsruhe (DE); Hartmut Wiggers, Reken (DE); Christof Schulz, Cologne (DE); Hans Orthner, Duisburg (DE); Jasmina Kovacevic, Essen (DE)

(73) Assignee: EVONIK OPERATIONS GMBH, Essen (DE)

( * ) Notice: Subject to any disclaimer, the term of this patent is extended or adjusted under 35 U.S.C. 154(b) by 0 days.

(21) Appl. No.: 16/007,547

(22) Filed: Jun. 13, 2018

(65) Prior Publication Data
US 2018/0366722 A1    Dec. 20, 2018

(30) Foreign Application Priority Data
Jun. 14, 2017  (EP) .................................... 17176040

(51) Int. Cl.
| | | |
|---|---|---|
| *C01B 32/956* | (2017.01) | |
| *C30B 29/36* | (2006.01) | |
| *H01M 4/36* | (2006.01) | |
| *H01M 4/38* | (2006.01) | |
| *H01M 4/58* | (2010.01) | |
| *H01M 10/0525* | (2010.01) | |
| *H01M 4/02* | (2006.01) | |

(52) U.S. Cl.
CPC ........... *H01M 4/364* (2013.01); *C01B 32/956* (2017.08); *H01M 4/386* (2013.01); *H01M 4/58* (2013.01); *H01M 10/0525* (2013.01); *H01M 2004/027* (2013.01)

(58) Field of Classification Search
CPC ...... C30B 29/36; C01B 32/956; C01B 32/963
See application file for complete search history.

(56) References Cited

U.S. PATENT DOCUMENTS

| | | |
|---|---|---|
| 5,108,729 A | 4/1992 | Gerhold et al. |
| 2009/0029256 A1 | 1/2009 | Mah et al. |
| 2019/0002352 A1 * | 1/2019 | Lyubina ................. C04B 35/575 |

FOREIGN PATENT DOCUMENTS

| | | | |
|---|---|---|---|
| DE | 10 2009 033 251 A1 | 9/2010 | |
| DE | 10 2016 203 324 A1 | 9/2017 | |
| EP | 0 421 314 A1 | 4/1991 | |
| EP | 2 782 167 A1 | 9/2014 | |
| EP | 3 026 012 A1 | 6/2016 | |
| EP | 3026012 A1 * | 6/2016 | ........... C01B 21/068 |
| WO | WO 79/00178 A1 | 4/1979 | |
| WO | WO 2011/006698 A1 | 1/2011 | |
| WO | WO-2017109098 A1 * | 6/2017 | ........... C04B 35/575 |

OTHER PUBLICATIONS

EP 3026012 machine translation.*
Extended European Search Report dated Sep. 7, 2017 in Patent Application No. 17176040.8, (with English translation of categories of cited documents), 6 pages.
Zhang, Z. et al., "Amorphous silicon-carbon nanospheres synthesized by chemical vapor deposition using cheap methyltrichlorosilane as improved anode materials for Li-ion batteries", Nanoscale, vol. 5, 2013, pp. 5384-5389.
Kasavajjula, U. et al., "Nano- and bulk-silicon-based insertion anodes for lithium-ion secondary cells", Journal of Power Sources, vol. 163, 2007, pp. 1003-1039.
Magasinski, A. et al., "High-performance lithium-ion anodes using a hierarchical bottom-up approach", Nature Materials, vol. 9, Apr. 2010, pp. 353-358.

* cited by examiner

*Primary Examiner* — Haidung D Nguyen
(74) *Attorney, Agent, or Firm* — Oblon, McClelland, Maier & Neustadt, L.L.P.

(57) ABSTRACT

A process for producing a silicon-SiC composite powder is provided. A gas stream I containing $SiH_4$, $Si_2H_6$ and/or $Si_3H_8$ and at least one hydrocarbon of ethene and acetylene and a coaxial gas stream II containing hydrogen are fed into a hot wall reactor. The gas stream II forms the jacket stream with respect to the gas stream I. At least the gas stream I is reacted at a temperature of 900° C. to 1100° C. and subsequently at the outlet of the hot wall reactor the reaction mixture is cooled or allowed to cool and the pulverulent reaction product is separated from the gaseous materials.

9 Claims, 2 Drawing Sheets

SYNTHESIS OF SILICON-CARBON COMPOSITE IN A GAS PHASE REACTOR

CROSS REFERENCE TO RELATED APPLICATION

This application claims the benefit of EP 17176040.8, filed Jun. 14, 2017, the entire disclosure of which is also incorporated herein by reference.

FIELD OF THE INVENTION

The invention relates to a process for producing a silicon-carbon composite which may be used as a composite or as an anode material in lithium-ion batteries.

BACKGROUND

Silicon composites have great potential as an anode material in lithium-ion batteries. On account of the large volume change of the silicon during repeated charging/discharging these silicon composites cannot be used as an anode material.

Intensive efforts have therefore been made to improve cycle stability through use of composites of silicon-graphite, graphene-nanosilicon, silicon-carbon nanotubes, silicon-carbon nanowires, carbon encapsulated with silicon and silicon encapsulated with carbon. Methods for producing these composites are for example pyrolysis, grinding or CVD processes. (Zhang et al., Nanoscale, 5 (2013) 5384 and Kasavajjula et al., Journal Power Sources 163 (2007) 1003).

Magasinki et al., Nat. Mater. 9 (2010) 353, describe the production of a silicon-carbon composite starting from monosilane and propene in a two-stage CVD process. In a first step silicon is applied atop a carrier by introducing an $SiH_4$/He mixture into a tubular reactor at 700° C. under vacuum. Subsequently, carbon is applied atop this silicon by introducing propene into the tubular reactor under the abovementioned conditions.

WO2011/006698 discloses a process for producing a nanostructured silicon-carbon composite in which a submicron silicon powder is added to a carbon-containing mixture produced by reaction of a hydroxyaromatic compound with an aldehyde and the mixture is carbonized at 500° C. to 1200° C.

A further variant is, according to Wang et al., Electrochem. Commun. 6 (2004), 689, the addition of nanocrystalline silicon powder to a gelling resorcinol/formaldehyde mixture which cures at 85° C. for 10 hours. This mixture is a compact block which is converted at 650° C. into a silicon-carbon composite comprising 40% carbon.

EP-A-2782167 discloses a process for producing an Si/C composite in which silicon and lignin are reacted in an inert gas atmosphere at at least 400° C.

US2009029256 discloses a process for producing an Si/carbon composite in which a mixture of alkaline earth metal and the silicic acid/carbon composite is heated in an inert atmosphere.

Laid-open specification DE 102009033251 A1 proposes a three-stage process for producing a composite from silicon-carbon or silicon-tin. Si or Sn nanoparticles are generated and subsequently introduced into an organic polymer. In the third step the system composed of polymeric matrix and the nanoparticles is pyrolyzed.

Patent application DE 102016203324.7 discloses a process for producing a silicon-carbon composite powder in which a silane is reacted in a hydrocarbon-containing gas stream in a hot wall reactor.

Conventional processes often comprise more than two stages and are therefore complex or they have the disadvantage of affording only small laboratory-scale quantities. The latter is for example caused by undecomposed precursors being deposited in the interior of the apparatus and requiring recurrent removal with shutdown of the apparatus. Accordingly, such processes often cannot be kept running stably over prolonged periods.

The present invention had for its object to provide a process which allows production of a composite based on silicon and carbon in fewer steps and using input materials available on a large industrial scale.

SUMMARY OF THE INVENTION

The invention provides a process for producing a silicon-SiC composite powder, which is characterized in that a) a gas stream I containing at least one silane selected from $SiH_4$, $Si_2H_5$ and/or $Si_3H_8$ and containing at least one hydrocarbon selected from ethene and/or acetylene, and a coaxial gas stream II containing hydrogen are fed into a hot wall reactor, wherein the gas stream II forms the jacket stream with respect to the gas stream I, and b) at least the gas stream I is reacted at a temperature of 900° C. to 1100° C. and subsequently at the outlet of the hot wall reactor the reaction mixture is cooled or allowed to cool and the pulverulent reaction product is separated from gaseous materials.

The process has the advantage that the hydrogen in the gas stream II as a coaxially injected veil gas serves as a heat transfer medium from the hot reactor wall into the core flow of the gas stream I. A further advantage is that deposits of undecomposed precursors are avoided with the coaxially injected gas stream I. In the conventional art deposits are caused by CVD processes for example.

DETAILED DESCRIPTION OF THE INVENTION

Figure 1:
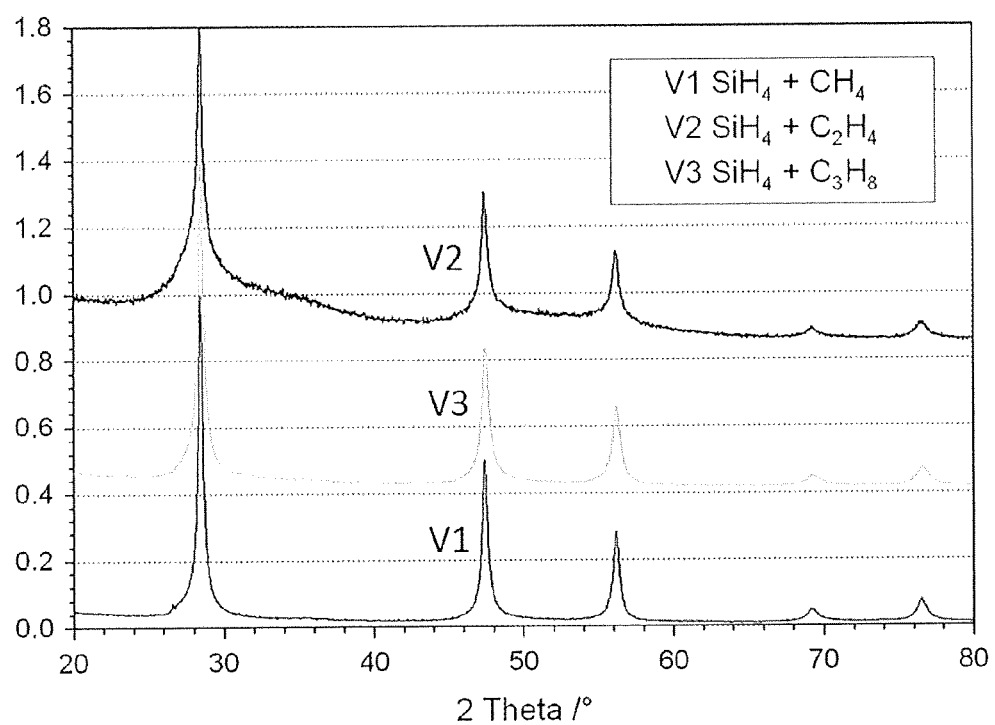
FIG. 1 shows normalized x-ray diffractograms.

The process according to the invention is more particularly elucidated hereinbelow.

It is preferable when the gas stream I, particularly preferably both gas streams, is/are respectively injected as a homogeneous mixture. It is very particularly preferable when at least one coaxial nozzle is employed in the hot wall reactor and the gas stream I is injected as a core stream and the gas stream II is injected as a jacket stream. It may further be advantageous to employ in the process according to the invention a heated reaction tube as the hot wall reactor, wherein the axis of the coaxial nozzle coincides with the main axis of the reaction tube. It is particularly preferable when a laminar flow through the hot wall reactor is established.

It may further be advantageous to employ ethene or acetylene and to additionally employ argon in the gas stream I. It is preferable to employ silicon and carbon in a stoichiometric ratio, preferably in a ratio of 20:1 to 1:10, particularly preferably of 1:1, in the gas stream I. When in the gas stream I monosilane is employed and ethane or acetylene chosen, the volume flow of the hydrocarbon(s) absent compared to volume flow of the silane(s) is preferably replaced by a noble gas volume flow, preferably by argon volume flow.

In the process according to the invention at least two heating zones may be employed in the hot wall reactor, wherein preferably the first heating zone is brought to a temperature of 900° C. to 1010° C. and the second heating zone is brought to a temperature of 1000° C. to 1100° C., preferably of 1050° C. to 1100° C.

When the gas streams I and II enter the heated reaction tube(s) of the hot wall reactor the core stream and jacket stream pass through initially the first heating zone of the reaction tube and subsequently the second heating zone. It is preferable when the hot wall reactor has a plurality of heating zones that are consecutively traversed by the flowing gases/the overall stream resulting from the gradual mixing of both the gas streams and decomposition reactions. It is particularly preferable to employ a reaction tube having two heating zones. When ethene and monosilane are employed, it may be advantageous to establish temperatures of 980° C. in the first heating zone and 1050° C. in the second heating zone.

The process according to the invention provides Si/C composites in the form of a pulverulent mixture or powder in which Si and SiC are present in a mixed state. The powder may be used as an electrode material in batteries or secondary cells.

Having generally described the invention, a further understanding can be obtained by reference to certain specific examples provided herein for purposes of illustrations only and are not intended to be limiting.

EXAMPLES

A hot wall reactor having a coaxial nozzle for introducing the gas stream I and II into the heated reaction tube was used in the inventive examples. The gas stream I was introduced as a homogeneous mixture as the core flow while the gas stream II contained hydrogen and was fed in as a coaxially injected veil gas. Apart from low-level local turbulence at the nozzle outlet a laminar flow through the hot wall reactor was accordingly established. The hydrogen served as a heat transfer medium from the hot reactor wall into the core flow.

In all inventive examples the hot wall reactor comprised at its outlet a filter comprising a plurality of filter elements by means of which the product was collected. The filter elements were freed of the product with nitrogen upon termination of the respective example. The product was packed and weighed under inert conditions via an airlock system.

Examples: Production of an SIC Composite Using Ethene/Acetylene

The compositions of the gas streams I and II are summarized in table 1. The data for the employed substances relate in each case to the volume flow [slm].

TABLE 1

Gas streams and temperatures

| | Gas stream I | | | II | Temperature of heating zone 2 | Temperature of heating zone 1 |
|---|---|---|---|---|---|---|
| | $SiH_4$ | Hydrocarbon | Argon | $H_2$ | | |
| Experiment 2 | 5 | ethene/2.5 | 2.5 | 70 | 1050° C. | 980° C. |
| Experiment 4 | 5 | ethene/2.5 | 2.5 | 35 | 1100° C. | 1010° C. |
| Experiment 6 | 10 | ethene/5 | 0 | 30 | 1100° C. | 970° C. |
| Experiment 7 | 5 | acetylene/2.5 | 2.5 | 35 | 1100° C. | 985° C. |

Apart from example 6, a stoichiometric ratio of Si to C was established in all cases and the volume flow in the core flow at the nozzle outlet was 10 slm in each of experiments 2, 4, 7. When the employed hydrocarbons had a lower volume flow compared to hypothetically employable methane the absent volume flow was supplemented by argon. The experiments were kept running without interruption and only terminated when an amount of SiC composite of at least 1 kg had been obtained in each case.

The hot wall reactor had two heating zones, 1 and 2, of which heating zone 1 had a length of about 40 cm while heating zone 2 had a length of about 50 cm. The temperatures were measured externally at the reactor wall in the central region of the heating zones in each case.

At the outlet of the reactor the reacted gas mixture was filtered and the product in the filter was saturated with nitrogen by backpurging of the filter element and packed under inert conditions via an airlock system. In all experiments removal of the products was problem-free.

During cleaning of the reactor after the respective experiments no caking on the walls or encrustations in the reaction tube whatsoever were observed and the coaxial nozzle also remained unblocked in both examples.

The quantity ratios and BET surface areas of the SiC generated according to the invention are shown in table 2. The crystallite sizes are to be regarded as average crystallite sizes whose values were calculated by the Rietveld refinement familiar to those skilled in the art.

TABLE 2

| | Si/SiC ratio [% by weight] | Si crystallite size [nm] | SiC crystallite size [nm] | BET surface area [$m^2 g^{-1}$] |
|---|---|---|---|---|
| Experiment 2 | 91/9 | 11 | 5.5 | 29.4 |
| Experiment 4 | 49/51 | 5 | 6 | 28.2 |
| Experiment 6 | 54/46 | 3.5 | 7 | 24.4 |
| Experiment 7 | 3/97 | 70 | 2.5 | 65 |

FIG. 1 shows with trace V2 the normalized x-ray diffractogram of the product from experiment 2 which was performed with ethene. For comparison the same figure shows the diffractograms of products performed as per experiment 2 but by contrast using propane (V3) or methane (V1) instead of ethene in gas stream I. Along the ordinate the counts obtained during x-ray diffractometry were substituted by arbitrary units.

In contrast to traces V1 and V3 in the x-ray diffractogram FIG. 1, trace V2 shows a very broad signal at 2Theta=34° which indicates the presence of SiC in the product.

A Rietveld refinement was also performed on each x-ray diffractogram to quantify the respective mass fractions. Based on the Rietveld refinement 91% by weight of Si and about 9% by weight of SiC were obtained in product V2 while negligible proportions of SiC were obtained after performing the experiment with propane (V3) or methane (V1) instead of ethene.

Experiments 4, 6 and 7 were performed as per experiment 2 but with the differences, apparent from table 1, that
- different temperatures had been established in heating zone 1 and heating zone 2 in each case and
- also greater residence times for the reactants of the gas stream I were established by choosing a reduced hydrogen stream in the gas stream II, namely 30 slm of $H_2$ in experiment 6 and 35 slm of $H_2$ in experiments 4 and 7, and
- a different $SiH_4$ to hydrocarbon/acetylene quantity ratio was chosen in experiment 6/experiment 7.

Figure 2:
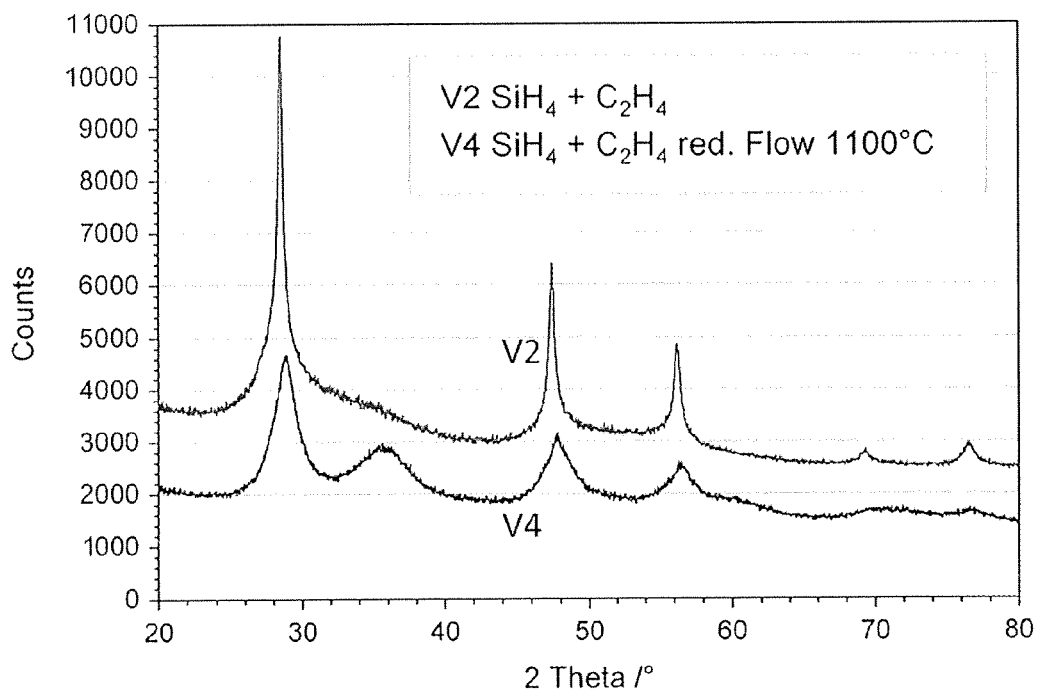
FIG. 2 shows X-ray diffractograms that are not normalized.

FIG. 2 shows the x-ray diffractograms of the products from experiments 2 and 4 in counts as a function of the angle 2Theta[°] in each case.

Compared to the very broad signal at 2Theta=34° in the trace for experiment 2, the trace for experiment 4 demonstrates at 2Theta=36° the presence of SiC in a much higher weight fraction, namely 51% by weight (V4) compared to 9% by weight (V2).

Numerous modification and variations on the present invention are possible in light of above teachings. It is therefore to be understood that within the scope of the appended claims, the invention may be practiced otherwise than as specifically described therein.

The invention claimed is:
1. A process for producing a silicon-SiC composite powder, the process comprising:
   a) introducing a gas stream I and a gas stream II via a coaxial nozzle having a core orifice and an outer orifice into a hot wall reactor, wherein the gas stream I comprising at least one silane selected from the group consisting of $SiH_4$, $Si_2H_6$ and $Si_3H_8$ and at least one hydrocarbon selected from the group consisting of ethene and acetylene is introduced into the hot wall reactor as a core stream via the core orifice; and the gas stream II containing hydrogen is coaxially introduced into the hot wall reactor via the outer orifice so that the gas stream II forms a jacket stream with respect to the gas stream I,
   b) reacting at least the gas stream I at a temperature of 900° C. to 1100° C. to obtain a reaction mixture, and subsequently
   c) cooling the reaction mixture or allowing the reaction mixture to cool at an outlet of the hot wall reactor and separating pulverulent reaction product from gaseous materials.

2. The process according to claim 1, wherein a laminar flow through the hot wall reactor is established.

3. The process according to claim 1, wherein in a), the gas stream I contains ethene or acetylene and further contains argon.

4. The process according to claim 1, wherein at least two heating zones are employed in the hot wall reactor.

5. The process according to claim 4, wherein a first heating zone of the hot wall reactor is heated at a temperature of 900° C. to 1010° C.

6. The process according to claim 5, wherein a second heating zone is heated at a temperature of 1000° C. to 1100° C.

7. The process according to claim 6, wherein the second heating zone is heated at a temperature of 1050° C. to 1100° C.

8. The process according to claim 1, wherein the hot wall reactor has a main axis and the coaxial nozzle has the same axis as the main axis of the hot wall reactor.

9. The process according to claim 1, wherein the gas stream I has a silicon to carbon ratio of from 20:1 to 1:10.

* * * * *